United States Patent [19]

Epstein et al.

[11] 4,114,112
[45] Sep. 12, 1978

[54] APPARATUS AND METHOD FOR EFFICIENT SYNTHESIS OF LASER LIGHT

[75] Inventors: Max Epstein, Highland Park; Michel E. Marhic, Evanston; Samuel E. Schacham, Chicago, all of Ill.

[73] Assignee: Northwestern University, Evanston, Ill.

[21] Appl. No.: 753,292

[22] Filed: Dec. 22, 1976

[51] Int. Cl.² .................................................. H01S 3/10
[52] U.S. Cl. ................................. 331/94.5 C; 350/274
[58] Field of Search ................. 331/94.5 M, 94.5 C, 331/94.5 Q, 94.5 R, DIG. 1; 350/169, 174; 35/19; 358/58; 362/259, 293; 356/188, 189, 235

[56] References Cited

U.S. PATENT DOCUMENTS

| | | | |
|---|---|---|---|
| 2,548,118 | 4/1951 | Morton et al. | 358/58 |
| 3,492,599 | 1/1970 | Rigrod | 331/94.5 C |
| 3,538,919 | 11/1970 | Meyers | 331/DIG. 1 |
| 3,626,322 | 12/1971 | Strouse et al. | 331/94.5 C |

*Primary Examiner*—William L. Sikes
*Assistant Examiner*—Marcus S. Rasco
*Attorney, Agent, or Firm*—Kegan, Kegan & Berkman

[57] ABSTRACT

Apparatus and method for synthesizing laser light characterized by a plurality of discrete wavelengths, without competition among different wavelengths. A preferred embodiment of the invention includes a laser resonator having an optical cavity bounded by a first, reflective end plate; a gas-filled chamber having a pair of Brewster windows, within the optical cavity; and a Brewster angle Pockels cell between one Brewster window and the partially reflective end plate. The laser resonator generates red, blue and green laser light simultaneously and the Pockels cell transmits red, blue and green light successively, at a rate of at least 30 cycles per second, so that the resulting laser beam appears white in color.

17 Claims, 7 Drawing Figures

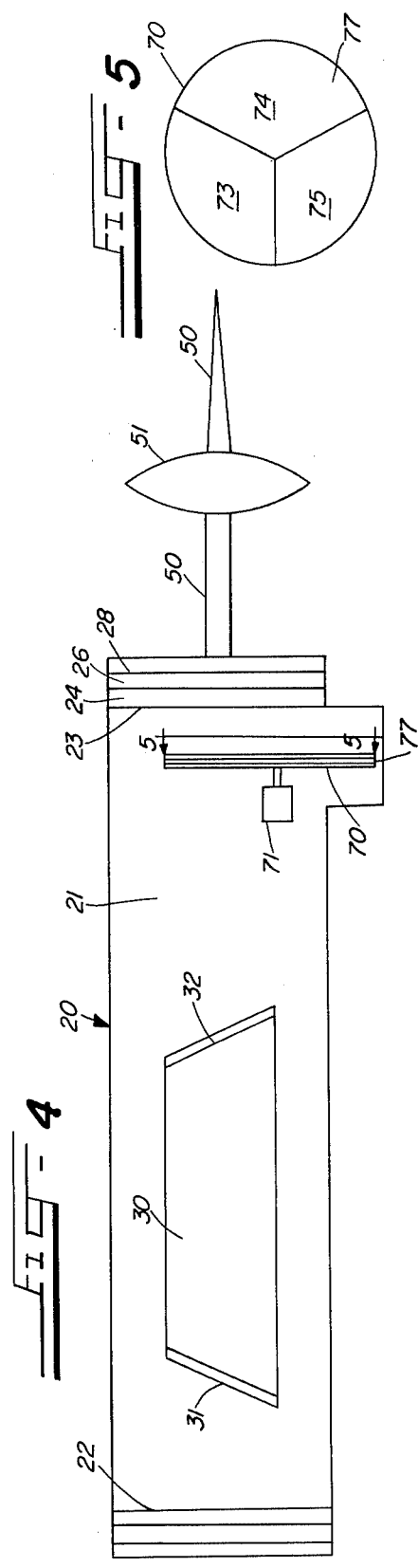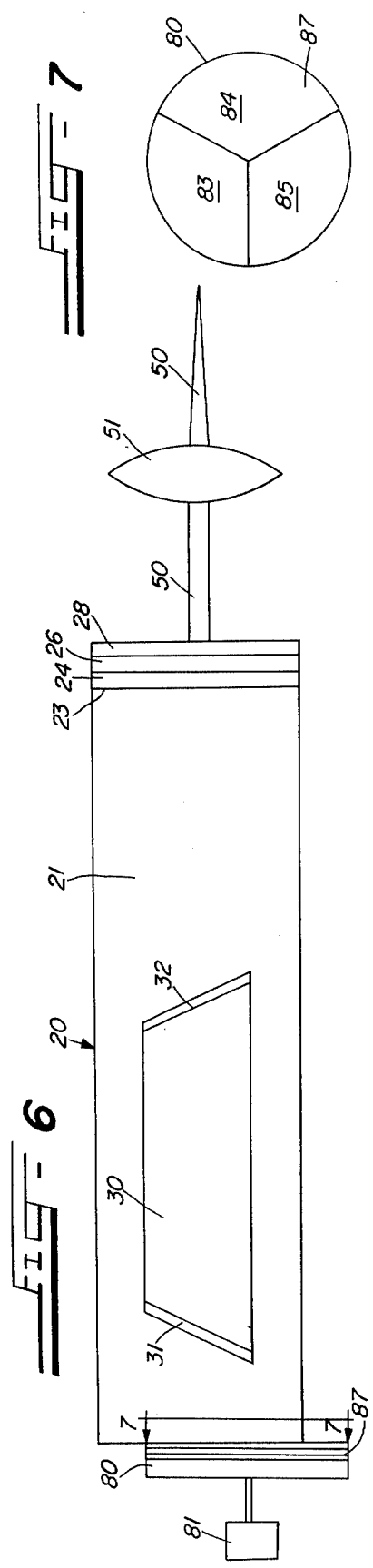

APPARATUS AND METHOD FOR EFFICIENT SYNTHESIS OF LASER LIGHT

The invention described herein was made in the course of work under a grant from the Department of Health, Education and Welfare.

BACKGROUND OF THE INVENTION

The use of fiber-optic devices for remote viewing and photography in medical and industrial applications requires efficient transmission of light through a limited number of optical fibers.[1] Limitations inherent in the imaging of conventional incoherent light sources onto small diameter fiber-optic bundles require the use of high-power sources such as arc lamps and result in undue increases in the size of the device. It has been shown that white light from a multiwavelength ion laser can be focused onto a single 85 μm optical fiber to provide adequate illumination for viewing and color photography.[2] Such a dramatic reduction in the number of required illumination fibers is of particular importance in medical instrumentation, allowing for either a significant reduction in the size of the instrument or a corresponding increase in the size of the ancillary channel to accommodate a larger surgical tool.

[1] M. Epstein, Opt. Eng., 13, 139 (1974).
[2] M. Epstein and M. E. Marhic, Proc. IEEE (Lett), 63,727 (1975).

The need for highly flexible optical fibers for imaging and illumination suggests the use of plastic optical fibers. In addition, unlike fibers made of glass, the plastic fibers do not require protective shielding when employed in medical instruments. In most applications, so far, plastic fibers have been used mainly for illumination; e.g., as light couplers in electro-optics or in display and decorative devices. The plastic optical fiber, not unlike its step-index glass counterpart, is made of two materials; e.g., in one type of optical fiber the core is made of polystyrene and the cladding of Lucite (polymethylmethacrylate) while in another Lucite is used for the core and poly (fluoroalkyl methacrylate) for the cladding. The fabrication of aligned plastic multifibers for imaging has been, so far, quite difficult mainly due to lack of raw materials with adequate mechanical properties; i.e., appropriately clad rods which can be pulled in a furnace to very thin fibers without breakage. Flexible plastic fiber-optic imaging structures have been constructed using an assembly of 10 × 10 arrays of fibers 250 μm square with each fiber 25 μm in diameter and have been used to construct a flexible laryngoscope for endotracheal intubation.[3] A single multifiber containing a large number of aligned plastic fibers has been fabricated with single fiber diameter down to 10 μm.[4] While further improvements in the fabrication of high-resolution plastic fiber-optic imaging structure can be expected, the selective transmission of light through such fibers limits their use for both imaging and illumination. White light transmitted through a plastic optical fiber appears yellow and, thus, distorts the reflected color image, a most objectionable feature, in particular, in medical applications. The use of synthesized light in a multiwavelength laser, however, allows for a convenient technique of compensation of the source, such that the reflected image appears as if illuminated with an undistorted white light. Of course, such compensation depends on the number of wavelengths of light used in the source, and, in the usual case of three colors, can, though quite adequately, be only approximated.

[3] C. M. Stiles, Q. R. Stiles, and J. S. Denson, JAMA, 221,1246 (1972).
[4] Made by Welch Allyn, Inc. Skaneateles Falls, N.Y. 13153.

When illuminated by a conventional white light source, such as in presently commercially available illuminators, the output of a plastic fiber-optic bundle appears yellow. FIG. 1 shows the transmittance of an optical step fiber consisting of a polystyrene core and Lucite cladding. The measurement was obtained with a Zeiss MM12 spectrophotometer using an aligned bundle of plastic fibers 66 cm long and 1 mm in diameter.[4]

[4] Made by Welch Allyn, Inc. Skaneateles Falls, N.Y. 13153.

In order to evaluate the color of the transmitted light, the C.I.E. chromaticity coordinates (trichromatic coefficients) were calculated.[5] Radiant power at different wavelengths was measured using an Oriel Model 7240 monochromator and a Coherent Radiation Model 212 power meter. The computed power, corrected for the response of the power meter and the monochromator, was multiplied by the values of the C.I.E. tristimulus functions $x$, $y$, and $z$ for the corresponding wavelengths. Summing the results for all wavelengths yields the three tristimulus values $$X = \Sigma E_\lambda \bar{x}_\lambda, \ Y = \Sigma E_\lambda \bar{y}_\lambda, \ Z = \Sigma E_\lambda \bar{z}_\lambda, \tag{1}$$

and the C.I.E. chromaticity coordinates can then be computed to yield $$x = X/(X+Y+Z) \text{ and } y = Y/(X+Y+Z). \tag{2}$$

The chromaticity coordinates for light emanating from the plastic fiber-optic bundle described above when illuminated with a quartz iodine tungsten projector lamp (ACM1 BLS97) fiber-optic illuminator) were found to be $x = 0.5$ and $y = 0.45$ with data points obtained every 10 nm apart. These coordinates correspond to the color of gold as shown by point A on the chromaticity diagram in FIG. 2. A similar measurement using an arc lamp source (Marc 300 in an ACMI FCB-1000 fiber-optic high-intensity illuminator) yielded an output light given by point D in FIG. 2, which corresponds to a pale yellow. It should be noted that the temperature at the input to the fiber-optic plastic bundle, even though coupled through another glass fiber-optic bundle, was high enough to melt the former.

[5] R. S. Hunter, The Measurement of Appearance, (Wiley-Interscience, New York, 1975), p.91.

In order to correct for the distorted color transmission through plastic fibers by means of filters, substantial reduction in total power is required. Thus, to achieve an output at a nearby white which is a warm white given by the chromaticity coordinates $x = 0.42$ and $y = 0.4$, point E in FIG. 2, requires a substantial reduction in overall radiant output power. For example, in the case of the projector-lamp source described above, a warm white light output can be achieved by decreasing the radiant power at the wavelengths from 510 nm and above by 75 percent, which results in an overall power reduction of 70 percent, or by reducing the output power above 560 nm and from 530 to 560 nm by 75 and 100 percent, respectively. Adding to the above the losses associated with focusing of incoherent sources onto fiber-optic bundles of very small diameter, and the need to use absorption filters at high light intensities, makes the use of conventional light sources impractical.

The use of synthesized white laser light provides a convenient solution to both the color balance and focusing problems. The ability to focus coherent light onto a very small diameter optical fiber allows for a very efficient use of the light source, i.e. nearly all of the radiant power generated can be applied to the fiber using a simple and inexpensive lens.[2] The white light is synthesized either by using three separate monochromatic lasers at the different colors, a multiwavelength laser or a combination of both.

[2.] M. Epstein and M. E. Marhic, Proc. IEEE (Lett), 63,727 (1975).

It is a principal object of the present invention to synthesize white laser light more efficiently than has been done using prior art methods. By decreasing power requirements of the laser it is possible to use an air cooling system rather than water cooling, and the laser can be produced more compactly and more inexpensively.

It is a related object of the present invention to provide a time multiplexing system for successively lasing at a plurality of discrete wavelengths, thereby eliminating competition among the various discrete wavelengths. By eliminating competition among wavelengths, lasers constructed in accordance with the teachings of the present invention may utilize many materials such as He-Se, He-I$_2$, and He-Ne-Cd-Se which have not heretofore been practical as lasing gases.

It is another object of the present invention to provide a method for selectively varying the color of light produced by a laser, without competition among discrete wavelengths. By producing laser light having an increased proportion of blue relative to red and green, such laser light will appear white after transmission through plastic optical fibers. The white laser light thereby synthesized is suitable for illuminating objects where color photographs are desired.

Yet another object of the invention is to eliminate scintillation effects which ordinarily accompany simultaneous lasing at a plurality of discrete wavelengths.

Additional objects and advantages of the present invention will become apparent from the following specification, taken in conjunction with the drawings.

BRIEF DESCRIPTION OF THE DRAWING

FIG. 3 is a schematic representation of a preferred embodiment of the apparatus of the invention, the function of which will become apparent from the following detailed description;

FIG. 4 is a schematic representation of a second embodiment of the apparatus of the invention;

FIG. 5 is a schematic lateral view of the transmission filter in the apparatus of FIG. 4, taken along the lines 5—5;

FIG. 6 is a schematic representation of a third embodiment of the apparatus of the invention; and FIG. 7 is a schematic lateral view of the reflection filter in the apparatus of FIG. 6, taken along the lines 6—6.

DESCRIPTION OF THE PREFERRED EMBODIMENTS

Figure 1:
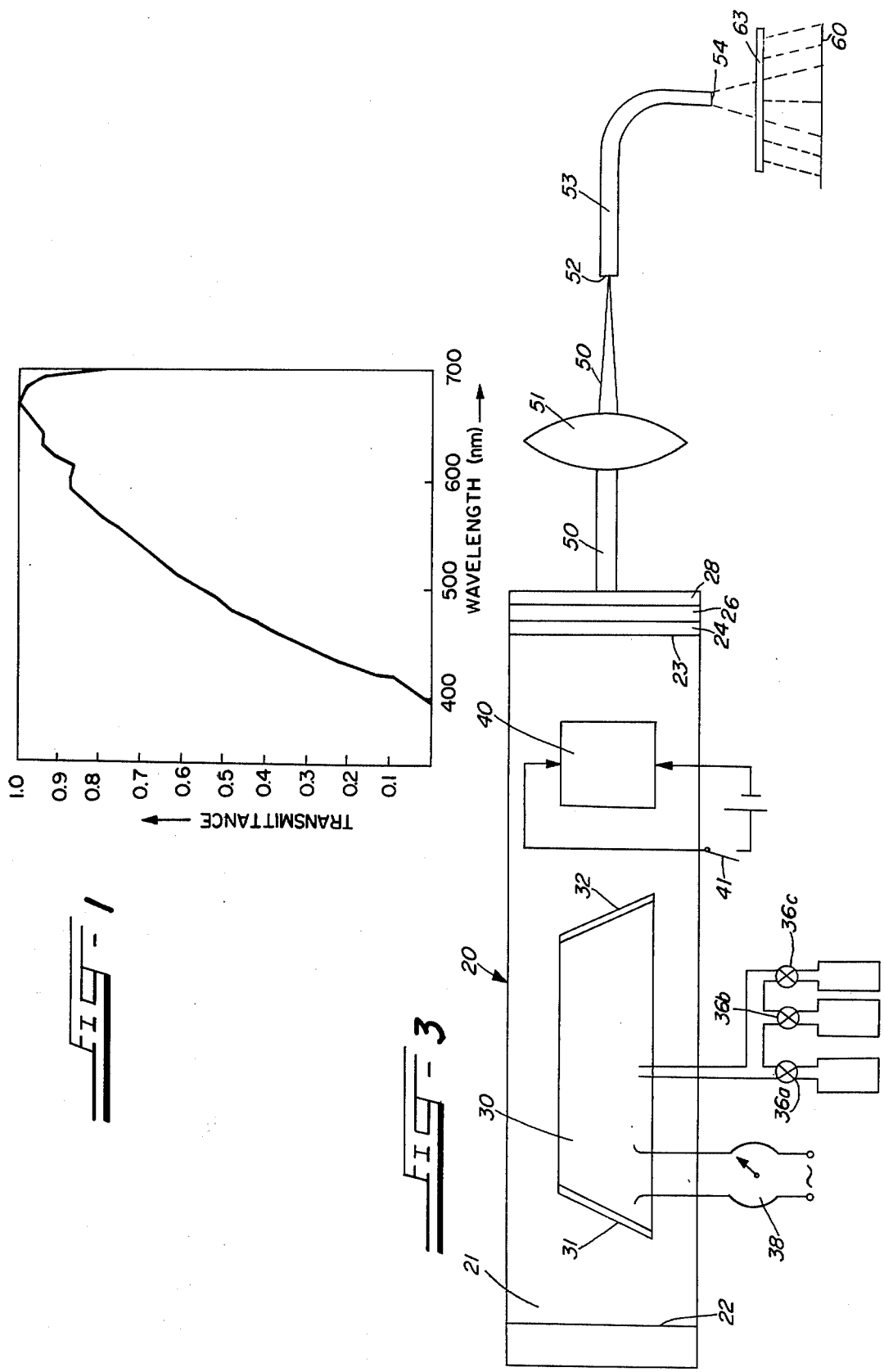
FIG. 1 is a graph showing transmittance of light through a plastic optical fiber as a function of wavelength; the fiber is an aligned multifiber 66 cm long, 1 mm in diameter, containing single fibers 10 μm in diameter.
Figure 2:
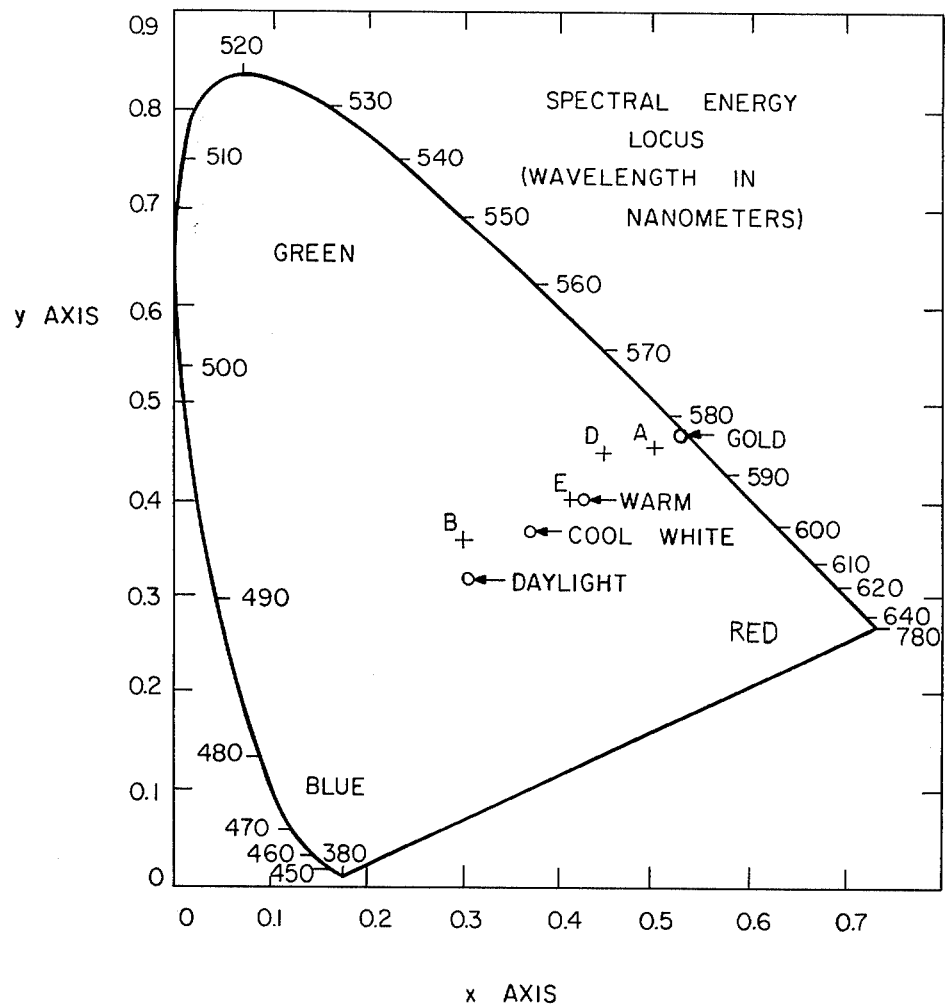
FIG. 2 is a C.I.E. chromaticity diagram.

The present invention is practiced by providing a laser with a special broad-band output mirror capable of simultaneously lasing at a plurality of different wavelengths. Through proper adjustment of gas pressures and discharge current, a balanced output of red, blue and green laser light is obtainable. All but one color is filtered successively, so that the laser beam is characterized by a rapid succession of red, blue and green laser light. The laser beam is focused onto an optically conductive medium preferably an optical fiber, and the fiber transmits light to illuminate a remote object or cavity to be photographed or viewed.

Referring now more particularly to the drawing in which three different preferred embodiments of the invention are illustrated, there is depicted schematically in FIG. 3 a tri-color laser 20. This laser 20 is a krypton-ion laser resonator (Spectra Physics Model 164) having an optical cavity 21 including therewithin a first, reflective end plate 22 and a second, partially reflective end plate 23 spaced from and parallel with the first end plate 22. Although the end plates 22, 23 illustrated are planar, persons skilled in the art will appreciate that concave end plates may be substituted therefor without impairing effectiveness of the laser 20. It will also be appreciated that conventional beam splitter output lenses combined with a reflective end plate may be substituted for the partially reflective end plate 23.

The partially reflective end plate 23 is a broad-band output mirror formed with superimposed, multi-layer dielectric coatings 24, 26, 28 capable of simultaneously lasing at three different wavelengths. Within the optical cavity there is provided a gas-filled chamber 30 having a pair of opposed Brewster windows 31, 32. Gas pressure 36 and discharge current 38 are adjusted to provide a balanced output at three different wavelengths, for example 476.2 nm (blue), 568.2 nm (green), and 647.1 nm (red).

Laser light stimulated within the optical cavity 21 is coherent and is polarized by the Brewster windows 31,32. In order to produce a rapid succession of laser light with discrete wavelengths, a Brewster angle Pockels cell is interposed between one of the Brewster windows 32 and the partially reflective end plate 23. The Pockels cell 40 is provided with a sequential switch or switch means 41 which is closed and reopened repetitively at a frequency of at least 30 cycles per second to depolarize successively and sequentially all but one color of light passing between the end plates 22,23. The Pockels cell 40 acts as a transmission filter or filter means with respect to laser light in the optical cavity 21.

The laser resonator 20 emanates a light beam 50 which is focused by a lens 51 onto an end 52 of a single plastic optical fiber 53 having a diameter of 34 μm. In the preferred embodiment shown the optical fiber has a polystyrene core and a cladding of Lucite (poly-methylmethacrylate). Optical fibers constructed of Lucite with a cladding of poly (fluoroalkyl methacrylate) are also suitable. Light emanating from a remote end 54 is directed to illuminate a remote cavity or other object 60 to be viewed or photographed.

In the preferred embodiment illustrated in FIG. 3, the Pockels cell 40 is adjusted to transmit an increased proportion of blue light relative to red and green. This compensates for the tendency of plastic optical fibers to filter out blue light, so that light emanating from the remote end 54 of the fiber 53 appears white in color.

As a means for reducing the speckle effect caused by coherency of the laser light, a 0.25 mm thick Teflon (polytetrafluoroethylene) diffuser disc 63 is interposed between the end 54 of the fiber 53 and the object 60. Optionally and preferably, the speckle effect may also be eliminated by an electro-mechanical vibrator (not shown) coupled to the lens 51 or optical fiber 53, as disclosed in U.S. Pat. No. 4,011,403 issued Mar. 8, 1977 for FIBER OPTIC LASER ILLUMINATORS.

A second embodiment of the time multiplexing laser of the invention is illustrated in FIGS. 4 and 5. In this embodiment the optical cavity 21 of the laser 20 is provided with a pair of spaced, parallel wide-band mirrors 23. The Brewster angle Pockels cell 40 is replaced by a rotating transmission filter 70 powered by an electric motor 71. The transmission filter 70 is divided into three sectors 73,74,75, as illustrated in FIG. 5. Each of the sectors 73,74,75 comprises a glass plate coated with layers of a dielectric film 77, making such sectors 73, 74, 75 differentially transmissive to red, blue and green light respectively. The transmission filter 70 is rotated at a rate of at least 30 cycles per second to produce a laser beam 50 characterized by a repetitive sequential succession of red, blue and green light. Because of the rapidity of color change, the laser beam 50 appears white in color to a human observer.

A third embodiment of the time multiplexing laser of the invention is illustrated in FIGS. 6 and 7. In this embodiment the optical cavity 21 of the laser 20 is provided with a rotating reflective mirror 80 powered by an electric motor 81. The glass mirror 80 is divided into three sectors 83, 84, 85 which are coated with layers of a dielectric film 87 making such sectors 83, 84, 85 differentially reflective to red, blue and green light respectively. The dielectric coating 87 causes this mirror 80 to act as a reflection filter, which is rotated at a rate of at least 30 cycles per second. This produces a laser beam 50 characterized by a repetitive sequential succession of red, blue and green light, which appears white in color to a human observer.

An important advantage of the time multiplexing laser of the present invention is that it eliminates competition among various lasing lines which is characteristic of prior art white lasers.[6,7] Thus, in order to elicit or enhance lasing at a given wavelength it has heretofore been necessary to accept considerable loss in the efficiency of lasing of lines at other wavelengths. The time multiplexing laser described herein eliminates competition by lasing a given wavelength or group of wavelengths separately in time but in a sequence fast enough to give an appearance of light at one color only, such as white.

[6] K. G. Hernquist and D. C. Pultorak, Rev.Sci. Instrum., 43,290 (1972).
[7] J. A. Piper, J. Phys. D: Appl. Phys., 7, 323 (1974).

The time multiplexing laser of the present invention will make practical for lasers numerous combinations of materials which have not heretofore been used because of excessive competition among lasing lines. One such laser is an early version of white laser, consisting of a mixed ion Ar-Kr laser, wherein the gas pressure and total pressure were adjusted to produce a balance among intensities of blue, green and red components.[8] Similarly, a desired color balance can be achieved by varying the pressure of helium in a hollow-cathode He-Cd laser.[9] Once the tubes have been sealed, however, only limited variations in color combinations can be achieved by varying the magnetic field and the discharge current in the Ar-Kr laser or by changing the cathode temperature in the He-Cd laser. Many other lasers have been proposed which provide continuous and simultaneous lasing at various wavelengths within the visible range, such as He-Se[10,11], He-I$_2$[12], and He-Ne-Cd-Se[13], and thus, makes them suitable in the design of white lasers.

[8] E. T. Leonard, M. A. Yaffee, and K. W. Billman, Appl.Opt.5, 1209 (1970).
[9] K. I. Fujii, T. Takahashi, and Y. Asami, IEEE J. Quantum Electron., QE-11, 111 (1975).
[10] W. T. Silfvast and M. B. Klein, Appl. Phys. Lett., 17,400 (1970).
[11] M. B. Klein and W. T. Silfvast, Appl. Phys. Lett., 18, 482 (1971).
[12] J. A. Piper and C. Webb, IEEE J. Quantum Electron., QE-12, 154 (1976).
[13] N. V. Sabotinov and P. K. Telbizov, Opto-electronics, (Lett.), 6, 185 (1974).

An additional advantage of the time-multiplexing laser of the present invention is that it eliminates scintillation effects which ordinarily accompany simultaneous lasing at different wavelengths.

While the present invention has been described with reference to three preferred embodiments, the invention is not limited thereto. Numerous modifications and equivalents of this invention will be evident to those skilled in the art without departing from the spirit and scope of the invention as defined in the following claims.

What is claimed is:

1. Apparatus for transmitting laser radiation characterized by three discrete wavelengths corresponding to red, blue, and green light through a conductive medium without substantial competition among said discrete wavelengths, said apparatus comprising
    (a) a laser simultaneously emitting three discrete wavelengths of radiation corresponding to red, blue and green light, and including an optical resonant cavity and an optical axis,
    (b) three filter means, each said filter means being differentially transmissive with respect to a discrete wavelength of radiation corresponding to red, blue and green light respectively,
    (c) means for successively interposing and removing each of said filter means with respect to said optical axis, thereby to generate a laser beam characterized by a succession of three discrete wavelengths, and
    (d) means for focusing the laser beam generated by said laser to impinge upon said conductive medium for transmission therethrough.

2. The apparatus of claim 1, wherein said filter means comprises three transmission filters.

3. The apparatus of claim 2, wherein said transmission filters are glass plates coated with a dielectric film.

4. The apparatus of claim 2, wherein said transmission filters are a transmission filter divided into three sectors differentially transmissive with respect to red, blue and green light.

5. The apparatus of claim 4, wherein said apparatus further comprises motor means adapted to rotate said transmission filter to interpose and remove said sectors successively, sequentially and repetitively with respect to said optical axis, thereby to generate a laser beam characterized by a repetitive sequential succession of three discrete wavelengths.

6. The apparatus of claim 5, wherein said motor means is adapted to rotate said transmission filter at a rate of at least 30 cycles per second, whereby said laser beam appears white in color.

7. The apparatus of claim 5, wherein said conductive medium comprises a plastic optical fiber.

8. The apparatus of claim 7, wherein the area of a sector of said transmission filter differentially transmissive to blue laser light is increased relative to the area of sectors differentially transmissive to red and green laser light, whereby laser light transmitted by said plastic optical fiber appears white in color.

9. The apparatus of claim 1, wherein said laser further comprises an end plate and motor means adapted to rotate said end plate, and wherein said filter means comprises a reflection filter divided into three sectors differentially reflective with respect to red, blue and green light, said reflection filter being affixed to said end plate for rotation therewith, whereby upon rotation of said end plate the sectors comprising said reflection filter are interposed and removed successively, sequentially and repetitively with respect to said optical axis, thereby to generate a laser beam characterized by a repetitive sequential succession of red, blue and green laser light.

10. A method for synthesizing laser radiation characterized by three discrete wavelengths corresponding to red, blue and green light without substantial competition among said discrete wavelengths, said method comprising the steps of
(a) stimulating emission of coherent radiation characterized by three discrete wavelengths corresponding to red, blue and green light in a laser having an optical resonant cavity and an optical axis, and
(b) interposing successively in said optical axis three filter means, each said filter means being differentially transmissive with respect to red, blue and green light respectively, thereby to generate a laser beam characterized by a succession of discrete wavelengths corresponding to red, blue and green light.

11. The method of claim 10, and further comprising the step of
(c) focusing the laser beam generated by said resonator to impinge upon a conductive medium for transmission therethrough.

12. The method of claim 10, wherein said three filter means are interposed successively in said optical axis at a frequency of at least 30 cycles per second, whereby said laser beam appears to be white in color.

13. The method of claim 10, wherein each said filter means comprises electro-optical wavelengthsensitive filter means.

14. The method of claim 11, and further comprising the step of
(d) transmitting said laser beam through a conductive medium comprising a plastic optical fiber.

15. A method for obtaining white illuminating light from a plastic optical fiber, said method comprising the steps of
(a) stimulating simultaneously in a laser emission of coherent radiation including visible blue light and visible red and green light to generate a laser beam characterized by a relative predominance of visible blue light,
(b) focusing the laser beam generated by said laser to impinge upon a plastic optical fiber,
(c) transmitting the laser beam through said plastic optical fiber, and
(d) illuminating an object with light transmitted through said plastic optical fiber.

16. Apparatus for obtaining white illuminating light from a plastic optical fiber, comprising
(a) a laser simultaneously emitting radiation having wavelengths corresponding to red, blue and green light, and including an optical resonant cavity, an optical axis, a Brewster window, and a partially reflective end plate;
(b) electro-optical wavelength-sensitive filter means interposed between said Brewster window and said partially reflective end plate, said filter means being more transmissive of blue light than red and green light;
(c) switch means coupled to said filter means for successively and sequentially depolarizing all but one color of light emitted by said laser, thereby generating a laser beam characterized by a predominance of blue light relative to red and green light;
(d) a plastic optical fiber; and
(e) means for focusing the laser beam generated by said laser to impinge upon said fiber.

17. The apparatus of claim 16, wherein said filter means comprises a Brewster angle Pockels cell.

* * * * *